United States Patent [19]

Glick

[11] Patent Number: 5,076,683
[45] Date of Patent: Dec. 31, 1991

[54] SPUNCAST COMPOUND CONTACT LENS

[75] Inventor: Robert E. Glick, Huntington Station, N.Y.

[73] Assignee: Allergan, Inc., Irvine, Calif.

[21] Appl. No.: 244,436

[22] Filed: Sep. 14, 1988

[51] Int. Cl.$^5$ .............................................. G02C 7/04
[52] U.S. Cl. ................................. 351/160 H; 351/161
[58] Field of Search ............... 351/160 R, 160 H, 161, 351/162, 177

[56] References Cited

U.S. PATENT DOCUMENTS

| | | | |
|---|---|---|---|
| 4,062,627 | 12/1977 | Wajs et al. | 351/160 |
| 4,095,878 | 6/1978 | Fanti | 351/161 |
| 4,139,513 | 2/1979 | Tanaka et al. | 260/29.6 TA |
| 4,256,369 | 3/1981 | Wichterle | 351/160 H |
| 4,434,113 | 2/1984 | Neefe | 264/2.1 |
| 4,534,723 | 8/1985 | Dillon et al. | 425/289 |
| 4,618,227 | 10/1986 | Bayshore | 351/161 |
| 4,874,234 | 10/1989 | Wichterle | 351/160 H |

FOREIGN PATENT DOCUMENTS 2160677A 12/1985 United Kingdom .

*Primary Examiner*—Scott J. Sugarman
*Attorney, Agent, or Firm*—George A. Skoler

[57] ABSTRACT

A reproducibly-made, wholly spuncast, non-truncated ballasted, compound surfaced soft contact lens and the method of making the same by spincasting a polymer forming monomer mixture.

1 Claim, 1 Drawing Sheet

SPUNCAST COMPOUND CONTACT LENS

BRIEF DESCRIPTION OF THE INVENTION

A reproducibly-made, wholly spuncasted, non-truncated ballasted, compound-surfaced soft contact lens and the method of making the same by spincasting a polymer forming monomer mixture.

BACKGROUND TO THE INVENTION

Toric lenses are simple lenses which have for one of their surfaces a segment of an equilateral zone of a torus and consequently have different refracting power in different meridians. A torus is a smooth rounded protuberance on a body part. A toric lens is used to correct astigmatism by the use of a surface of compound curvature. Such lenses have been commercially available for a long period of time. The compound curvature constitutes small variations in thickness in the lens in the optic region to make adjustments according to the prescription of the wearer of the lens to correct the wearer's astigmatism problem. The thickness differences in a contact toric lens in the optic region may vary as little as 0.03 millimeters (mm) yet represent from about 8 to about 30 percent of the depth or thickness of the lens.

Because the toric lens contains a surface of compound curvature, the orientation of the lens relative to the orientation of the eye is important for effective visual correction of the astigmatic problem. Such orientation is a more difficult technical problem in the case of contact toric lenses.

There is a class of bifocal contact lens which selects a predetermined region removed from the lens' central axis to locate the near vision element. These lenses rely on refractive monofocal optics to generate the far and near focal powers. Like the contact toric lens, the bifocal contact lens of this type relies on proper orientation of the lens on the eye to assure efficacy of the lens.

In order for such contact lenses to orient appropriately on the eye, they should have a thickness differential coupled to a sloping wedge-like cross-sectional profile in the top midperiphery of the lens. This involves the generation of sloping surfaces from about the periphery, especially the mid-periphery, of the lens such that as the slope of the lens approaches the optic region, the lens gets thicker. This sloping wedge-like profile in the contact lens functions in concert with eyelid movement over the lens to force the alignment of the lens in the eye such that the corrective toric or bifocal surface is properly aligned for visual benefit and correction. Because of the history of the contact lens art, the techniques has been frequently referred to as "ballasting." Though somewhat inappropriate, that term is used herein to refer to the aforementioned sloping wedge-like profile.

There are a number of ways of ballasting a contact lens. They include placing a thin top peripheral cross-sectionally wedge-like section in the lens with or without a slabbed section at the bottom portion of the periphery of the lens. The optical axis of the lens may or may not provide the common axis of curvature for the front and back surfaces of the lens. When it is not, then the thin top peripheral cross-sectionally wedge-like section in the lens is a prism ballast. A lens which possesses a thin top peripheral cross-sectionally wedge-like section with or without a slabbed section at the bottom portion of the periphery of the lens is termed herein a "thin-sectioned ballasted contact lens."

Thin-sectioned ballasted contact lenses have been used in the ophthalmic industry for correcting the visual orientation of lenses used to correct a number of vision defects such as astigmatism and presbyopia. In order to correct these visual anomalies, the contact lens must maintain a preferential orientation on the user's eye. The thin-sectioned ballasted contact lens cooperates with eyelid movement to maintain the required orientation.

Extraordinarily tight lens dimensional tolerances are required to reliably predict the equilibrium position of a thin-sectioned ballasted contact lens on the user's eye. The consequence of inadequate dimensional conformance is unpredictable lens orientation and, as a result, residual astigmatism in the case of toric lenses and blurry vision in the case of bifocal lenses. The unpredictable orientation greatly compromises the correction of astigmatism in the case of toric soft contact lenses and presbyopia in the case of bifocal soft contact lenses. Consequently, such unpredictable orientation frequently compromises the ultimate visual acuity and stability of vision provided by these modalities of vision correction.

The degree of accuracy required of the manufacturing process is much higher for a ballasted contact lens than a spherical lens as a spherical lens does not need to maintain a preferential orientation on the user's eye. Ballasted contact lenses are routinely manufactured using lathing and cast molding techniques. Lathing processes used to manufacture prism ballasted torics are complex and labor intensive as many cutting and polishing steps are needed to generate the required lens geometry. The cast molding technique simplifies and reduces the labor intensiveness of the manufacturing operation. The complex geometry needed to produce a ballasted toric lens is placed on master molds. The master molds are typically replicated with a thermoplastic using injection molding.

The fabrication of the master molds is complex and labor intensive. However, the master mold can be used to reproducibly generate thousands of injection molded parts. The toric or bifocal contact lens is cast against convex and concave injection molded parts. The process yields lenses which do not require surface polishing. Toric lathing processes, as a result of their complexity and labor intensiveness, yield lenses which are substantially more expensive and less reproducible than cast molded torics.

It is known in the contact lens art that spincasting provides a means for reproducibly manufacturing spherical soft contact lenses at a low cost. However, spincasting introduces technical issues, if used for the manufacture of lens that have an irregular shape, that do not exist with lathing and casting. For example, a toric lens has compond curvature and a bifocal lens where the near correction surface are off-centered, has a multifaceted surface which is another form of a compound curvature. In spincasting, these compound surfaces have to be on the anterior surface of the lens and the posterior should have the requisite corneal cup shape. Thus, the female spincasting mold surface for such compound surfaced lenses would have to incorporate such compound surfaces in its design. In cast molding this poses no problem because the posterior is separately controlled by the presence of a male mold. More of the lens-forming monomers can be fed to the mold and the compression of the two molding surfaces in cast molding assures the integrity of both surfaces. In lathing, the lens button being lathed can have a perfectly shaped corneal cup and lathing away of excess plastic from the anterior surface can be used to provide the compound anterior surface without disturbing the corneal cup surface (posterior surface) of the lens.

A spincast contact lens is difficult to produce with ordered symmetrically aligned surfaces. This can be appreciated from a consideration of the dimensions of a contact lens. The hydrated lens typically had a diameter of about 12 to about 16 mm. The center thickness may range from about 0.13 mm, in the case of a $-5$ diopter lens, to about 0.35 mm, in the case of a $+4$ diopter lens. Such lenses taper of in thickness to the feathered edges at the periphery. The amount of resin used in spincasting the lens is extremely small. For example, there is used about 30 microliters of the lens-forming monomers in making each lens.

These facts demonstrate the seeming improbability of using spincasting alone as a method for making lenses possessing a compound anterior surface such as a toric and bifocal lens. The expectation would be that the centrifugation of the small amount of lens-forming monomers in the cavity mold would sweep it across the mold's surface in a manner that the posterior surface would replicate or possess a translation of the anterior surface of the lens. This would result in a corneal bowl shape that also possessed the compound surface that is on the anterior surface. This could only result in the fit of the lens being uncomfortable to the wearer of the lens and adversely affect the corrective capabilities of the lens. On the face of it, spincasting would appear to be a poor choice of processes for making contact lenses with compound surfaces.

Quite surprisingly, it has been determined that spincasting can be used to make a lens with a compound anterior surface and with a corneal bowl, posterior surface, that does not possess a translation of the anterior surface.

An objective of the present invention is to simplify the manufacturing and improve the accuracy of ballasted compound surfaced lenses such as toric and bifocal lenses by employing spincasting. It is objective of the invention to inexpensively produce compound surfaced lenses by spincasting. It is another object of the invention to reproducibly produce compound surfaced lenses by spincasting.

THE INVENTION

This invention relates to a reproducibly-made, wholly spuncasted, non-truncated, ballasted soft contact lens containing a compound anterior surface and the method of making the same by spincasting a polymer forming mixture. More particularly, the invention relates to reproducibly-made, wholly spuncasted, non-truncated, ballasted toric or bifocal soft contact lenses containing compound anterior surfaces and the method of making the same by spincasting polymer forming mixtures. In a preferred embodiment of the invention, the ballasting comprises thin sections at peripheral sections of the lens.

The invention includes the process of reproducibly making a wholly spuncasted, non-truncated, ballasted soft contact lens containing a compound anterior surface which comprises the spincasting a polymer-forming, lens-forming monomeric mixture in a cavity mold where the mold surface possesses the compound curvature and thin sectioned ballasting for the lens, rotating the monomer mixture in the mold whereby the mixture replicates the mold's surface while at the same time forms on polymerization a corneal bowl free of the compound curvature and the thin sectioned ballasting, and initiating the polymerization of the lens-forming monomer mixture during such rotation whereby to form a reproducible, non-truncated, thin-sectioned ballasted lens containing a compound anterior surface.

The invention relates to a reproducibly-made, wholly spuncasted, non-truncated, thin-sectioned ballasted soft contact lens containing a compound anterior surface wherein the thickness profile of the lens is either symmetrical or asymmetical with respect to the lens' geometric center.

The invention includes the spincasting of a polymer-forming, lens-forming monomeric mixture in a cavity mold where the mold surface possesses the compound curvature for a toric or bifocal soft contact lens and thin sectioned ballasting for that lens, rotating the monomer mixture in the mold whereby the mixture replicates the mold's surface while at the same time forms on polymerization a corneal bowl free of the compound curvature and the thin sectioned ballasting, and initiating the polymerization of the lens-forming monomer mixture during such rotation whereby to form a reproducible, non-truncated, thin-sectioned ballasted lens containing a compound anterior surface.

DETAIL DESCRIPTION OF THE INVENTION

Figure 1:
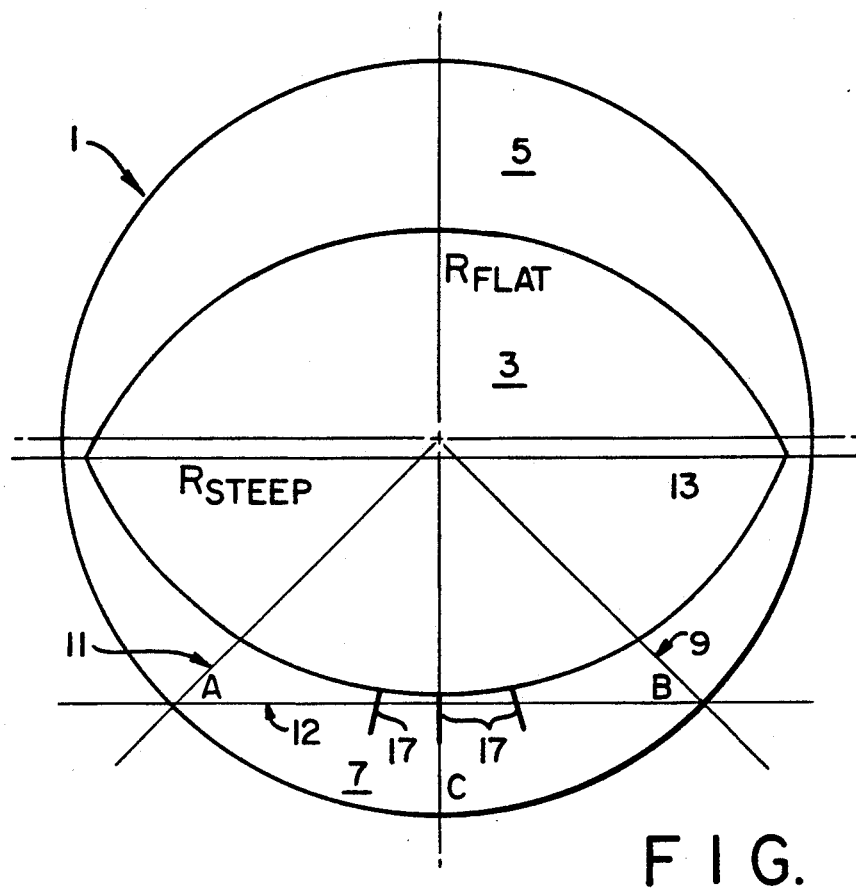
FIG. 1 is a top (plan) view of a spincasted toric lens containing the compound toric curvature and thin-sectioned ballasting.

Briefly: Spincast molding begins with the fabrication of a convex master mold. The master mold is replicated by an injection moldable thermoplastic. Liquid monomer mixture is dispensed onto the casting surface of the concave injection molded part. The mold, containing the liquid polymer-forming or lens-forming monomers (materials), is spun at a precise spin rate which determines the radius of curvature of the spun surface. The monomers are polymerized with thermal or ultraviolet energy. The spincast process yields surfaces which do not require additional treatment.

In the fabrication of contact lenses by spincasting, the lens-forming material is placed in the mold cavity having an optical concave surface wetted by said material, and then intermittently and forced fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophylicity or wettability in a manner well-known in the art. The speed of rotation of the tube and the molds is adjusted to cause and/or maintain radially outward displacement of the lens-forming mixture to a predetermined lens configuration which when subjected to the polymerization conditions employed in the tube will form the desired shaped contact lens. Rotational speed of, for example, 300 r.p.m., and lower, to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed below and readily apparent to the artisan.

Illustrative of relevant prior art that describes the practice of spincasting are the following:

O. Wichterle, U.S. Pat. No. 3,660,545, patented May 2, 1972

D. Rawlings, U.S. Pat. No. 4,517,138, patented May 14, 1985

D. Rawlings, U.S. Pat. No. 4,517,139, patented May 14, 1985

D. Rawlings, U.S. Pat. No. 4,551,086, patented July 11, 1983

D. Rawlings, U.S. Pat. No. 4,468,184, patented Aug. 28, 1984

D. Rawlings, et al., U.S. Pat. No. 4,534,723, patented Aug. 13, 1985

The liquid lens-forming mixture can comprise monomer, prepolymer or vulcanizable components. Particular suitable components are hydrophylic monomers preferably including those which form slightly or moderately crosslinked, three dimensional networks such as those disclosed in U.S. Pat. No. 3,822,089. Illustrative hydrophylic monomers include water soluble monoesters or an acrylic acid or methacrylic acid with an alcohol having an esterifiable hydroxyl group and at least one additional hydroxyl group such as the mono- and polyalkylene gylcol monoesters or methacrylic acid and acrylic acid, e.g., ethylene glycol monomethacrylate ("hema"), ethylene glycol monoacrylate, diethylene glycol monomethacrylate, diethylene glycol monoacrylate, propylene glycol monomethacrylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; and the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophylic monomers particularly useful in the practice of the invention to manufacture contact lenses include hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated.

The above illustrated monomers, monomeric mixtures including mixtures of hydrophobic and hydrophylic reactants, may be further admixed with a minor proportion or di- or polyfunctional species include: divinylbenzene, ethylene glycol diacrylate or dimethacrylate, propylene glycol diacrylate or dimethacrylate, and the acrylate or methacrylate esters of the following polyols: diethanolamine, triethanolamine, glycerol, pentaerythritol, butylene glycol, diethylene glycol, triethylene glycol, tetraethylene glycol, mannitol, sorbitol, and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos.: 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, furfural, etc.; and mixtures thereof. Frequently, the solvent component utilizes, to control solution or dispersion viscosity, a minor amount of the reaction medium, i.e., less than about 50 weight percent. That portion of the solvent can be termed a reactive diluent.

Polymerization of the lens-forming mixture may be carried out with free radical catalysts and/or initiators or the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, to about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the polymerization column (tube), as typically used in spin casting, has to be fabricated from a material that will not impede the transmission of the radiation into the polymerization zone of the column. Glass, such as Pyrex, would be a suitable material for the polymerization column when using long wave U.V. radiation as the catalyst. When using other types of catalysts as recited above, the polymerization column could be fabricated from various types of metals such as steel, nickel, bronze, various alloys, and the like.

A feature of the invention involves the moderation of the polymerization reaction. Because the mass of the lens-forming monomer mixture is so small (about 30 microliters) and is spread out over a relatively large area so as to form a thin symmetrical film called the lens, the rate at which the polymerization reaction is effected for the compound surfaced lens of the invention is moderated as compared to the reaction rate of a comparable lens but which is devoid of the compound surface. The reason for this is simple. The compound surface presents a variability in the cross-sectional thickness that is not found in the conventional essentially spherical lens of the prior art. This variability in thickness creates portions of the lens which will complete its cure prior to other portions of the lens. If the reaction rate is not moderated and the cure is effected in the same manner as the conventional lens, the resultant lens will frequently be warped. Therefore, to avoid such warpage, it is desirable to slow down the polymerization. The appropriate conditions for polymerization is a somewhat trial and error process because they are predicated on a variety of factors such as the selection of the monomers in the lens-forming monomer mixture, the curing agent or catalyst, the initiator system, the thickness of the lens to be formed, and the like. As a rule, U.V. light is used to initiate the decomposition of the cure catalyst. The intensity of the light can be easily reduced to slow down the rate of decomposition of the initiator, and this effectively reduces the rate of the free radical reaction, thus moderating the rate of the reaction. Therefore, the invention comprises the carrying out of the reaction at conditions that avoid warpage of the lens by too rapid rate of polymerization.

Various techniques are described in the art for the creation of a toric surface on a contact lens. The techniques described in the art are primarily directed to lathing a plastic contact lens button to generate a toric surface. Such techniques are also useable for lathing the master mold from which is made the plastic mold used in spincasting the toric lens of the invention. Illustrative of art describing such techniques are the following: U.S. Pat. Nos. 3,900,972, 3,902,277, 3,913,274, 4,178,720, and 4,680,998, and USSR Patent No. 984,693.

Prism-free, thin-sectioned ballasted, spincast contact lenses, which are symmetrical with respect to the geometric center, are generated from master molds which are created by rotating the master mold, in the lathing of it, about the axis which passes through the apex of the central arc on the mold's casting surface. Additionally, the casting surface and central arc should be concentric with respect to the molds outer surface. A characterization of a prism-free, thin-sectioned ballasted, spincast contact lens can be found in U.S. Pat. No. 4,095,878. The patent fails to describe how or whether the toroidal surface is formed by spincasting, but does indicate at col. 2, lines 45-47, that if the lens is formed by "centrifugal molding the flattening must be part of the mold."

Thin-sectioned prism ballasted, spincast contact lenses are generated by offsetting the central radius of the master mold, on the proposed casting surface, with respect to the edge of the casting surface and mold's outer diameter. The resulting spincasting mold is rotated about an axis which passes through the geometric center of the casting surface when making the lens. Though the spincasting mold's surface is offset to allow for the generation of the prismatic ballast, the spuncast surface forms independently of the surface it is cast against and is symmetrical with respect to the axis of rotation. In other words, the central axis of the mold is symmetrical to the peripheral edge of the lens being formed.

As a result of the offset central arc on the mold's casting surface, the prismatic ballasted lens' thickness profile is asymmetrical with respect to its' geometric center. The asymmetrical thickness profile acts as a prism and displaces light passing through the lens. The prism ballasting creates a thickness differential on the lens which results in a preferential lens orientation on the user's eye. The anterior surface geometry of the spuncast prismatic or prism-free ballasted toric may be similar to that found on several commercially available lathed toric lenses. It comprises a toric optic zone, which is decentered with respect to the apex of the base curve, possesses a midperipheral curve which isolates the toric optic zone from the periphery, and a flattened region at the bottom of the lens which enhances patient comfort and orientation stability. The lens may possess a small band about its peripheral edge located on the anterior surface which has a center of arc which is not offset, thus the center arc is the axis of rotation for the purpose of yielding an edge geometry of uniform thickness about the lens. This edge enhances user comfort.

The complex anterior surface geometry of the ultimate contact lens is placed on a metal master mold, such as a stainless steel master mold, by lathing. The master mold is thereafter accurately replicated with an injection moldable thermoplastic. Many different thermoplastics may be employed for the spincasting mold, such as polypropylene, polyethylene, polystyrene, polyvinyl chloride, their various copolymers, and the like. Polyvinylchloride is preferred because it has a low level of shrinkage during injection molding, is chemically compatible with lens materials in their monomeric and polymerized states and readily transmits ultraviolet light. As pointed out above, it is preferred that the molds be characterized by a pretreated optical surface to increase its hydrophylicity or wettability in a manner well-known in the art. Such treatment is not required of a polyvinylchloride mold.

The stainless steel master mold are fabricatable to a dimensional accuracy superior to the accuracy of lathed and polished plastic surfaces generated by a high volume toric lathing processes. Moreover, a single master mold can be used to generate 50,000-100,000 injection molded casts which are the molds in which the spuncast lens is made. The spuncast lens accurately replicates the mold's casting surface. The polymerized lens expands isotropically during hydration, thereby preserving the lens' proportions. These factors collectively contribute to the minimization of lens to lens variability. This would be the case even with, for example, a 43 percent water content hemamethacrylic acid copolymer spuncast lens. The lens of the invention may be hydrated to a water content from about 30 to about 90 percent by weight.

With respect to FIG. 1, there is shown a top view of a spincasted toric lens containing the compound toric curvature (not specifically depicted), and thin-sectioned ballasting. Because of the thoughness of replication, FIG. 1 may be used as well to characterize the top view of the spincasting mold surface, the anterior (female concave) surface of the injection mold and the master mold used to form the injection mold. Lens 1 is provided with top flattened (or prismatic) section 5, eliptical section 3 and slabbed off section 7. The toroidal surface is part of section 3 and generates an undulation in section 3 which is not shown. The toroidal surface is specifically inputted in the master mold surface to accomodate a particular astigmatism problem. The slabbed off section 7, which accomodates to the lower lid of the eye, is provided between lines 9, 11 and 12. The steepest curvature within the toroidal surface of the lens is located at $R_{STEEP}$. In a typical lens (dehydrated), that may be a curvature of about 8.07 mm. The $R_{FLAT}$ area could have a radius of curvature of 8.42 mm. The bottom flat section 7 (the slabbed off section) may have a thickness varying from about 0.35 mm at points A and B, to a thickness at point C at the 6 o'clock position, of 0.2 mm. measured about 0.25 mm from the edge. The conventional lens is provided with orientation markings 17 which comprise slots that are about 0.3 to about 0.4 mm deep and about 0.15 long. The figure gives conventional angles of orientation of the above sections and components.

Figure 2:
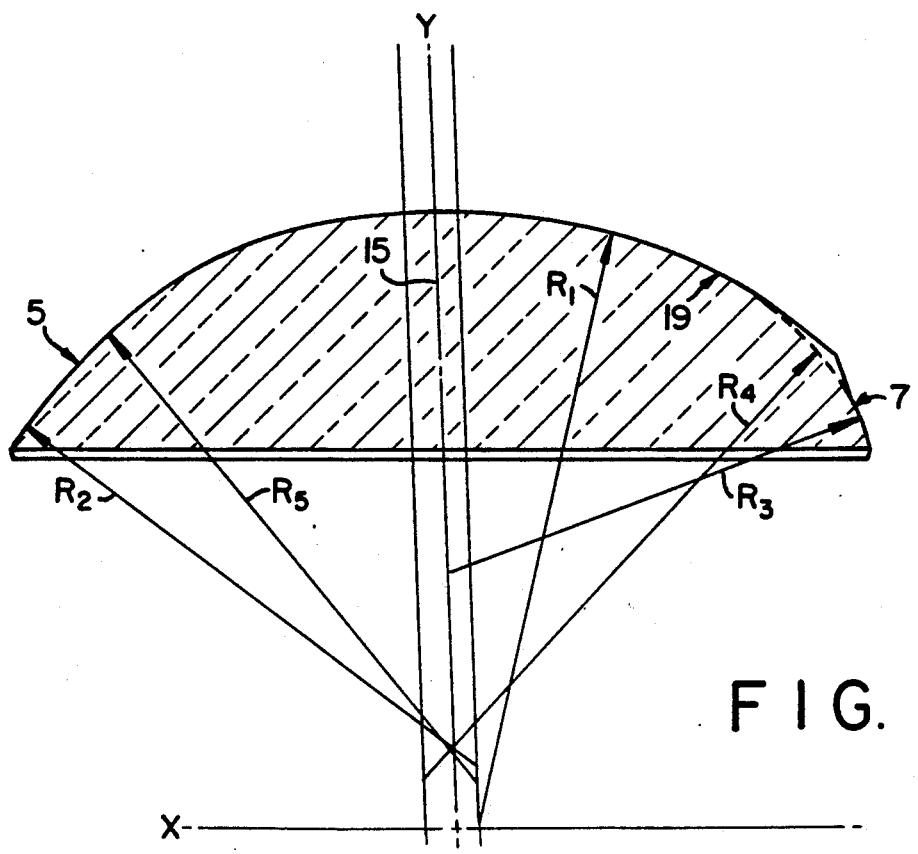
FIG. 2 is a side cross-sectional view of a spincast mold where the interior molding surface is the same as the anterior surface of the lens of FIG. 1

With respect to FIG. 2, there is shown a side view of a spincast mold where the interior molding surface is the same as the anterior surface of the lens of FIG. 1. As pointed out above, because of the thoughness of replication, FIG. 2 may be used as well to characterize the profile of the lens, the anterior (female concave) surface of the injection mold and the master mold used to form the injection mold. A variety of radii are characterized that are used in defining the surface 19 of the mold. The cross-sectional side view view indicates that the central radius is offset with respect to the Y-axis 15 by 0.3 mm. A 0.3 mm. offset will produce a lens having about 1.25 diopters of prism. As a result of the prism, the thickness differential between the 12 and 4:30 o'clock positions and the 12 and 7:30 o'clock position on the lens is approximately 0.27 mm. The prism region of the mold extends from section 5 to points A and B. The slabbed off section 7 makes the lens more comfortable to the wearer.

I claim:

1. A reproducibly-made, wholly spuncasted, non-truncated, ballasted soft contact lens containing a compound anterior surface, a thickness profile that is asymmetical with respect to its geometric center to provide a prismatic lens with the central axis of its posterior surface symmetrical to its peripheral edge.

* * * * *